United States Patent [19]

Barroza

[11] 3,877,725
[45] Apr. 15, 1975

[54] WHEEL DRIVING APPARATUS
[76] Inventor: Herbert Barroza, 2293 Aupaka St., Pearl City, Hawaii 96782
[22] Filed: Mar. 26, 1973
[21] Appl. No.: 344,971

[52] U.S. Cl. .................................... 280/242 WC
[51] Int. Cl. ............................................ B62m 1/16
[58] Field of Search .... 280/242, 242 WC, 243, 244; 297/DIG. 4

[56] References Cited
UNITED STATES PATENTS

| | | | |
|---|---|---|---|
| 2,130,426 | 9/1938 | Henderson | 280/244 |
| 3,189,368 | 6/1965 | Petersen | 280/242 R |
| 3,301,574 | 1/1967 | Good | 280/242 WC |

Primary Examiner—David Schonberg
Assistant Examiner—Randall Schrecengost
Attorney, Agent, or Firm—James C. Wray

[57] ABSTRACT

A wheel chair is driven by installing a carrier around a segment of a support wheel and hand wheel combination and by pivoting a gripper device having upper and lower concave and convex jaws on a pin in the carrier. A handle pivots the jaws and clamps the hand wheel and moves forward to carry the jaws, hand wheel and carrier forward. Upon pulling the handle rearward, it releases the hand wheel and abuts a stop on the carrier to prevent rearward clamping and to permit recovery of the handle and carrier. Slightly raising the handle disengages the stop so that the handle may be tipped rearward to lock the jaws on the hand wheel and to pull the jaws, handle and carrier rearward with the hand wheel. In the changed position of the handle, during forward movement, the handle abuts a second stop on the carrier preventing forward tipping of the jaws and gripping of the hand wheel while the handle and carrier are recovered in the forward direction. Bends on the inward leg of the carrier engage fixed structure on the wheel chair, preventing over-travel of the carrier and maintaining the carrier and handle within easy reach of the user. The handle is hinged to permit it inward tipping. A brake shoe is rigidly cantilevered inward from the handle above the main driving wheel. Pulling inward on the handle engages the brake with the driving wheel, tending to stop the wheel and the wheel chair. A spring between the gripper blocks and the brake urges the brake into an upward position and the handle into an outward position.

9 Claims, 5 Drawing Figures

WHEEL DRIVING APPARATUS

BACKGROUND OF THE INVENTION

Wheel chairs are generally driven by gripping hand wheels positioned laterally outward on supportive wheels and turning the hand wheels to turn the supportive wheels. In the case of paraplegics having full control of arms and upper body muscles, that method of propelling a wheel chair is quite satisfactory. Gripping and turning hand rims provides excellent exercise as well as convenient means for propelling and turning wheel chairs. Quadriplegics may have some ability to move the upper part of the body and the arms but may not have sufficient control to grip and turn hand wheels. While quadriplegics can operate controls for powered wheel chairs, the use of powered wheel chairs is abhorrent to those who would maintain and develop their physical powers through the exercise of self-propulsion of wheel chairs.

Some devices have been developed to promote and facilitate movement of wheel chairs by occupant propulsion. Many of those patented developments are classified in Class 280, subclass 242 of the United States Patent Office classifications. Examples of those devices are found in U.S. Pst. Nos. 3,189,368 and 3,301,574 in which spring centered handles may be pivoted to bite into rubber tires of wheel chairs for advancing the tires upon further movement of the handles. A somewhat related device which uses a series of levers and a dog to frictionally engage the rubber tire of a wheel chair is shown in U.S. Pat. No. 3,309,110. U.S. Pat. No. 3,623,748 describes a spring mounted handle which may be forced downward between specially configured double hand wheels to frictionally engage the hand wheels for pushing the hand wheels forward. U.S. Pat. Nos. 3,666,292 and 2,643,898 show reciprocal wheel drive levers. U.S. Pat. Nos. 654,986 and 2,847,058 show gear and chain mechanisms for driving wheel chairs.

All of the known suggested devices have drawbacks which render their use difficult or which prevent their use with conventional wheel chairs which are readily available in commercial channels. Most of the devices require special unique attachments. Some of the devices are inherently damaging to wheel structures. Most of the devices have preferential directional movement. Some of the devices are incapable of reversing, which inherently makes them incapable of turning and especially turning in small radii turns. Some of the devices require non-uniform movements or compound movements which make them difficult to operate. None of the known devices operate on conventional hand wheels, and none of the devices positively grip wheels in a clamping action. None of the known devices provide braking with the same lever that is used in propulsion.

SUMMARY OF THE INVENTION

The present invention overcomes many of the problems which remain in the art of occupant self-propulsion aiding devices for wheel chairs. The present invention provides a positive clamping of the hand wheels of conventional wheel chairs and provides a braking of the wheels using the same handle which is employed for propulsion. Directional reversing of the wheels is provided with a simplified handle movement. Positive stops are provided to insure against gripping of the hand wheel in the undesired direction when recovering the driving handle.

The broad objectives of the wheel driving apparatus of the present invention are accomplished by mounting a carrier on the axle of a wheel and providing a pin on the carrier near a periphery of the wheel and providing an opposed jaw clamping device pivoted on the pin for positively grabbing the wheel with a handle connected to the clamping device for turning the device on the pin and clamping and unclamping the wheel and for advancing the clamped wheel with the clamping device and carrier and for releasing the wheel at the end of a stroke and recovering the clamping device.

In a preferred embodiment the pin is generally horizontally oriented in the carrier, and jaws of the clamping device face downward and upward to engage upper and lower surfaces of a wheel. In other embodiments, the pin may be vertically oriented or radially oriented with respect to the wheel with inward facing jaws on the clamping device to engage sides of the wheel or rim.

Objectives of the invention are accomplished by providing positive lockout elements between the clamping device and the carrier to limit relative tipping of the clamping device on the pin to a predetermined direction, whereby clamping of the wheel is prevented when pulling the handle and carrier in the opposite direction for recovering the handle and carrier.

A further objective of the invention is accomplished by providing a means between the locking device and its handle which permits the clamping device to be pivoted with respect to the carrier in either a first or second predetermined direction and which at the same time prevents tipping of the clamping device in the other direction for preventing gripping of the wheel in the non-selected direction. In a preferred embodiment, the directional selection of clamping and non-clamping is provided by first and second opposed and offset stops on the carrier and first and second lugs on the handle for selectively engaging the stops on the carrier and means to move the handle forward and outward to select one or the other lug.

Another object of the invention is accomplished by providing a hinge between the clamping device and handle with a brake shoe cantilevered from the handle over a peripheral portion of the wheel whereby moving the handle in a direction transverse to propulsion movement of the handle causes bearing of the brake on the wheel, tending to slow and stop the wheel according to the pressure applied on the handle.

Another object of the invention is accomplished by providing unique structural details in the carrier for engaging fixed projections on the wheel chair frame, thereby preventing excessive movement of the carrier in either angular direction and holding the carrier and handle in accessible locations at all times. In a preferred embodiment, the structural device which limits travel is provided by constructing a dog-leg bend in the carrier for engaging fixed structure on the wheel chair frame.

These and other objects and features of the invention are apparent in the disclosure which includes the drawings, the foregoing and ongoing description with the detailed description of one preferred embodiment of the broad invention and the claims which form a part of the disclosure.

DETAILED DESCRIPTION OF THE DRAWINGS

Figure 1:
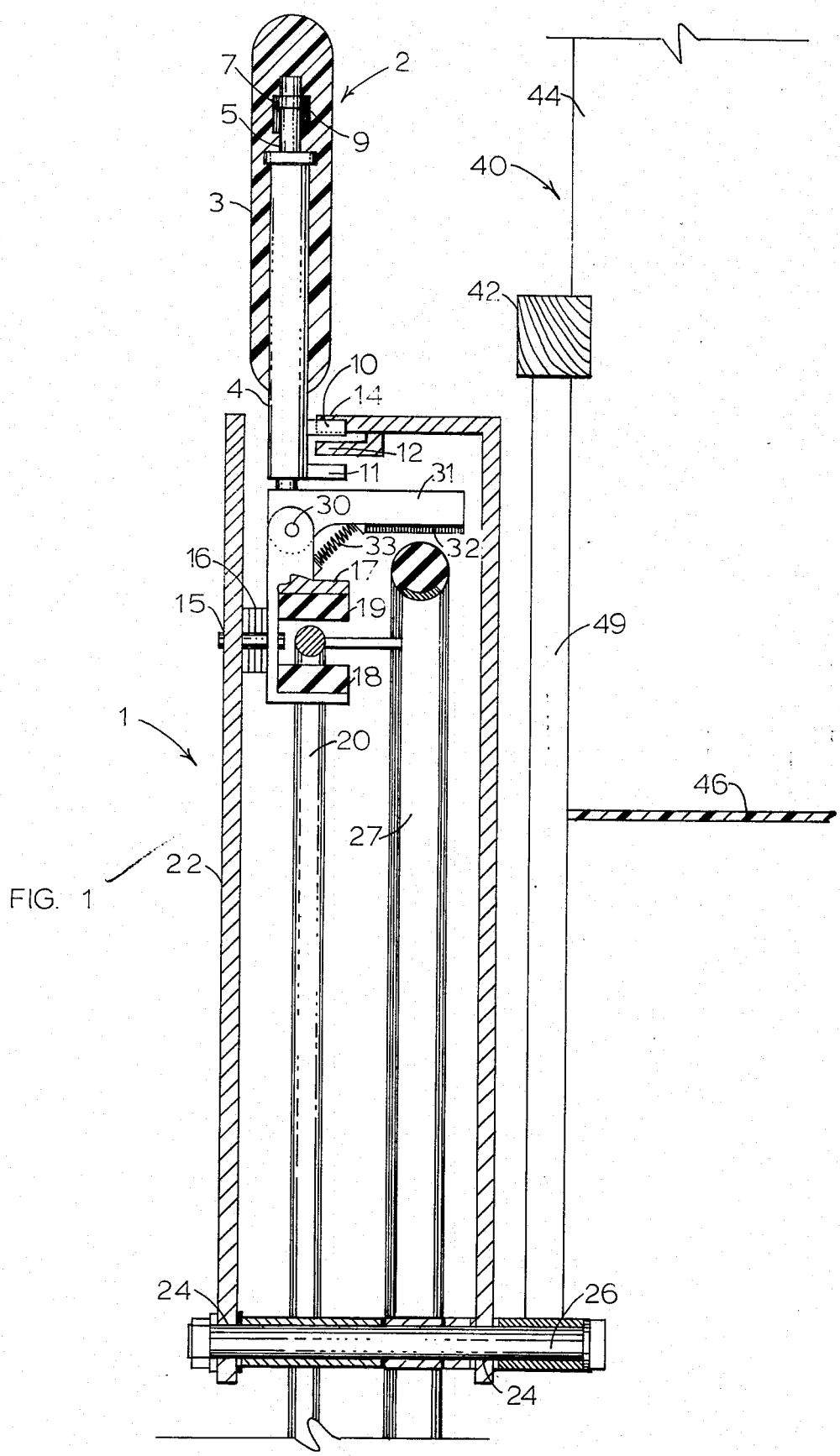
FIG. 1 is a schematic view of a portion of a wheel chair frame with an outward extending axle, a supportive wheel mounted on the axle and a wheel drive apparatus mounted on the axle. A gripping device is slightly spaced from a hand wheel and a brake extends over the main supportive wheel.

Throughout the drawings like numerals represent like parts. A wheel chair driving apparatus is generally indicated by the numeral 1. An upward extending handle 3 is gripped by the occupant and is moved forward and rearward in a simple arc to propel the wheel chair either forward or backward. Inward movement of handle means 2 and handle grip 3 as later will be described, effects a braking of the wheel chair.

Handle 3 is attached to tubular shaped member 4 which slides over a bar 5. Relative vertical movement of tube 4 and bar 5 is limited by an extension 7 mounted near the end of the bar and a channel 9 in the interior of the handle. Tube 4 has outward extending lugs 10 and 11 rigidly secured to the tubular handle portion. Lugs 10 and 11 selectively abut opposed and relatively displaced stops 12 and 14 to limit the gripping action to a single pre-selected direction. When handle 3 and tube 4 are in the relative position with respect to bar 5 as indicated in the drawing, lug 10 engages stop 14 to prevent relative tipping of the handle around pin 15 and to prevent gripping of the wheel when moving handle 3 in a direction into the plane of the drawing. When handle 3 is raised, lug 10 disengages stop 14, and lug 11 abuts the opposite face of stop 12 to prevent relative tipping of handle 3 and tube 4 about pin 15 in the direction out of the plane of the drawing.

Figure 2:
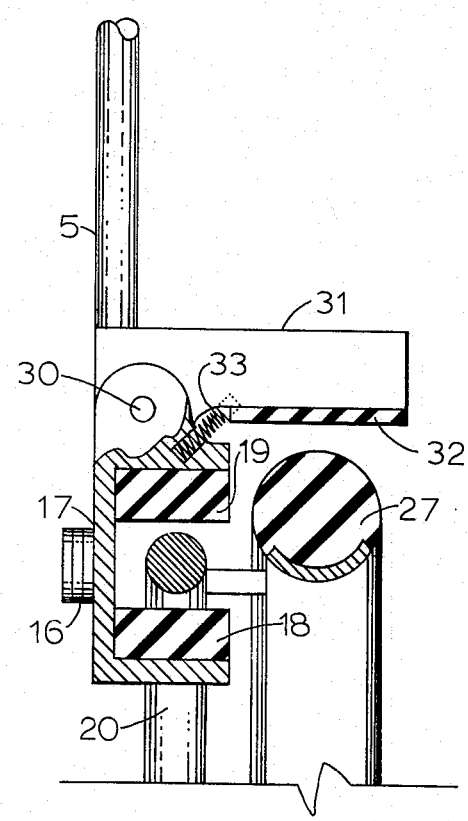
FIG. 2 is a detail of the gripping device and brake shown in FIG. 1.
Figure 3:
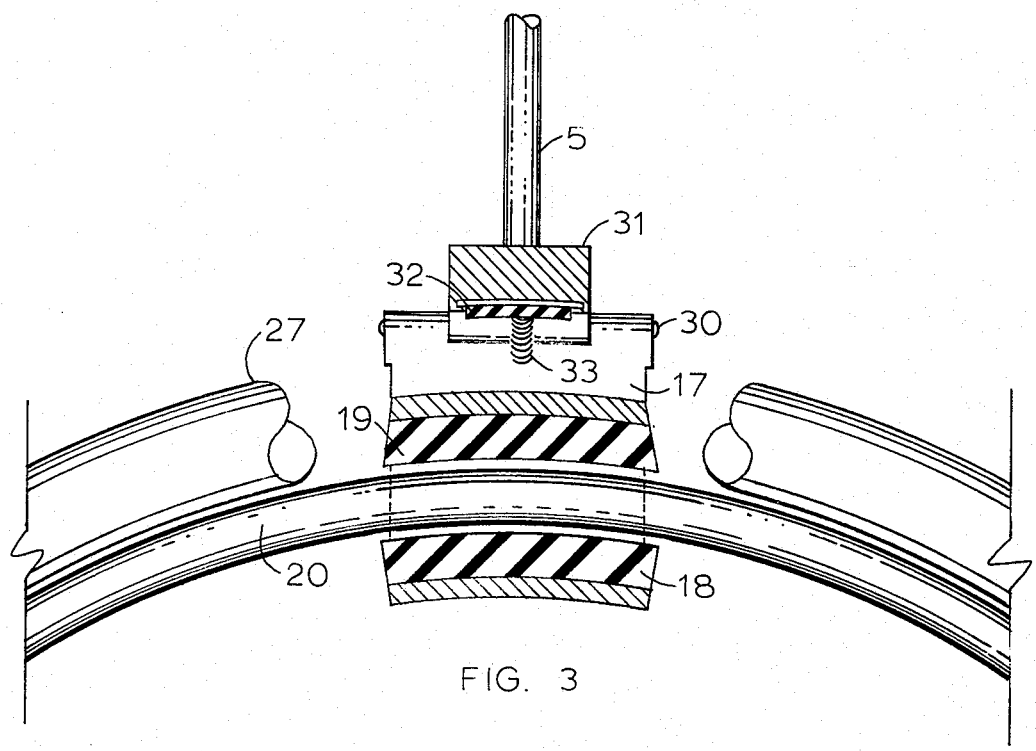
FIG. 3 is a side elevational detail with a supportive wheel partially cut away to reveal the gripping and braking members.

As can be best observed with reference to FIG. 1 and to the accompanying details in FIGS. 2 and 3, handle bar 5 is attached to a clamping device 17 which is pivoted on pin 15. Friction reducing spacers 16 provide ease of movement of the clamping device 17 on pin 15. Clamping device 17 has backing members which support opposed rubber jaws 18 and 19. As can be best seen in FIG. 3, the opposing surfaces of the jaws are curved to follow the curvature of the hand wheel 20 on which the jaws clamp. Downward facing jaw 19 has a concave surface, and upward facing jaw 18 has a convex surface. Clearance between the jaws and the hand wheel is minimal commensurate with the tolerances of roundness of the hand wheel 20 and dimensional tolerances of the driving mechanism. The clearance is emphasized by unusual enlargement in FIGS. 1 and 2 to facilitate an understanding of the invention.

As bar 5 and clamp 17 are tipped in either direction about pin 15, jaws 18 and 19 grip hand wheel 20. Reverse tipping is prevented by the lugs and stops previously described, so that the tipping and clamping is effected only in one pre-selected direction.

As shown in FIG. 1 pivot pin 15 is mounted on a carrier 22 which extends around a segmental portion of the wheel. Carrier 22 has bearing portions 24 which are mounted on an extended wheel chair axle 26. The wheel chair axle 26 holds the main supportive wheel 27. Hand wheel 20 is outwardly supported from wheel 27 by a plurality of brackets, bolts and spacers, usually four in number.

To provide a brake, handle bar 5 and gripping device 17 are joined by a hinge 30. A brake 31 is cantilevered outward from bar 5 and a brake shoe 32 is connected to the bottom element 31. Brake shoe 32 is positioned above main supportive wheel 27 so that the brake shoe 32 engages the wheel upon inward movement of bar 5 and handle 3 in a clockwise direction as shown in FIGS. 1 and 2. A compression spring 33 holds shoe 32 spaced upward from the wheel 27 in the normally disengaged position of the brake.

Figure 4:
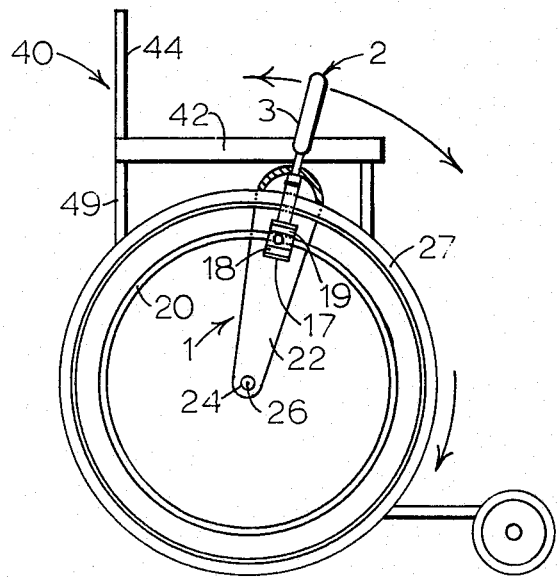
FIG. 4 is a side elevational schematic view of a wheel chair with the drive device attached.

As shown in FIGS. 1 and 4, a schematically representative wheel chair is generally indicated by the numeral 40. The wheel chair has an arm rest 42 and a back 44 which extends upward from a seat 46 and which is supported on a frame 49. Moving handle 3 in the arc represented in the FIG. 4 schematic drawing automatically effects a forward tipping of the handle and gripping device 17 and a gripping of hand wheel 20 when advancing the handle and consequently carrier 22 in a forward direction and automatically results in the releasing of the grip when recovering the handle and carrier in a rearward direction with a resultant forward movement of wheel 27 in the direction indicated by the arrow.

Figure 5:
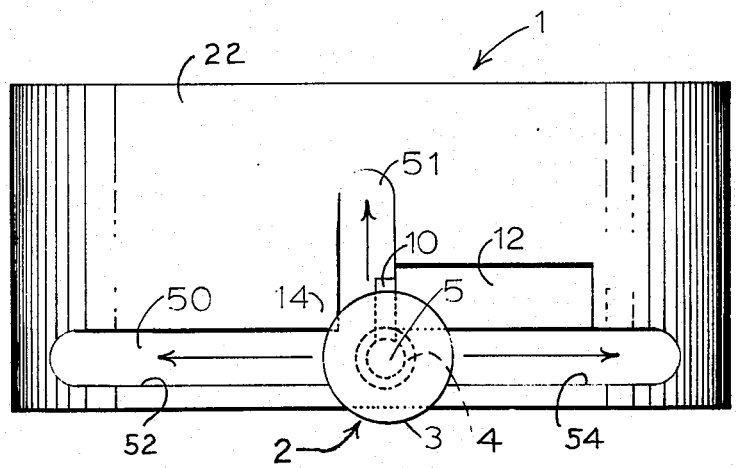
FIG. 5 is a schematic detail of the T-shaped slot which permits forward and reverse propulsion and braking of the wheel.

FIG. 5 is a plan view of the driving apparatus which is generally indicated by the numeral 1. The upper surface of carrier 22 has a T-shaped slot 50 which guides the movement of the tubular portion 4 of handle 3. When it is desired to stop the wheel chair, handle 3 and tube 4 are pulled inward into the section of the T-shaped slot which is indicated by the numeral 51. In the lowered position of the handle lug 10 on tube 4 encounters stops 14 which prevent movements of the handle into the section of the T-shaped slot indicated by the numeral 52. Stop plate 12 is depressed from the remainder of the upper surface portion of carrier 22. Lug 10 freely passes over stop plate 12 and the handle tube 4 moves into the area of the T-shaped slot which is indicated by the numeral 54. When the handle so moves, the gripping device 17 is tipped to firmly clamp the hand wheel 20. When handle 3 is raised, lug 10 passes over the top surface of the carrier and handle tube 4 freely moves into slot potion 52. At the same time, a lower lug abuts stop plate 12, preventing movement of the handle into the slot portion 54. In the latter condition, with the handle raised, clamping device 17 tips rearward to clamp the hand wheel 20 and to drive the wheel rearward upon further movement of the handle 3 and carrier 22. Forward movement of the handle 3 causes the clamping device to release the hand wheel and causes the lower lug 11 to abut stop plate 12. Further forward movement of the handle recovers the position of the handle and drags along carrier 22 to the recovered position, readying the apparatus for the next rearward clamping and moving stroke.

Although the invention has been described with reference to a specific embodiment, it will be obvious to those skilled in the art that modifications may be made without departing from the spirit and scope of the invention. The scope of the invention is defined in the following claims.

I claim:

1. Wheel driving apparatus comprising a frame, an axle mounted on the frame, wheel means mounted on the axle for rotating with respect to the frame, a carrier mounted on the axle and extending along the wheel, a pin connected to the carrier opposite a peripheral portion of the wheel means, opposed inner and outer gripper means mounted on the pin for rotation thereon and positioned adjacent opposite portions of the wheel means, and a handle extending upward from the gripper means, whereby the gripper means may be rotated on the pin into gripping contact with the wheel portions, and whereby further movement of the handle means pulls the gripper means, wheel means, pin and carrier in a rotating movement about the axle.

2. The wheel driving apparatus of claim 1 wherein the carrier has a first limit means, and wherein the handle means has a second limit means, which together cooperate to permit tipping of the handle means and opposed gripper means only in one selected direction, whereby the gripper means is held released from the wheel when the handle, gripper means and carrier are recovered after a driving movement.

3. Wheel driving apparatus comprising a frame, an axle mounted on the frame, wheel means mounted on the axle for rotating with respect to the frame, a carrier mounted on the axle and extending along the wheel, a pin connected to the carrier opposite a peripheral portion of the wheel means, opposed gripper means mounted on the pin for rotation thereon and positioned adjacent opposite portions of the wheel means, and a handle extending upward from the gripper means, whereby the gripper means may be rotated on the pin into gripping contact with the wheel portions, and whereby further movement of the handle means pulls the gripper means, wheel means, pin and carrier in a rotating movement about the axle a first limit means comprising upper and lower lugs on the carrier, and a second limit means comprising corresponding lug means on the handle, and wherein the handle is longitudinally moveable to engage the upper or lower lug for permitting tipping and gripping in a forward direction or in a rearward direction, wherein the limit means together cooperate to permit tipping of the handle means and opposed gripper means only in one selected direction, whereby the gripper means is held released from the wheel when the handle, gripper means and carrier are recovered after a driving movement.

4. Wheel driving apparatus comprising a frame, an axle mounted on the frame, wheel means mounted on the axle for rotating with respect to the frame, a carrier mounted on the axle and extending along the wheel, a pin connected to the carrier opposite a peripheral portion of the wheel means, opposed gripper means mounted on the pin for rotation thereon and positioned adjacent opposite portions of the wheel means, a first upper gripper having a downward concaved surface and a second lower gripper having an upward convex surface having radii of curvature generally similar to radii of curvature of the wheel means, wherein the opposed gripper means are curved to follow curvature of the wheel means, and a handle extending upward from the gripper means, whereby the gripper means may be rotated on the pin into gripping contact with the wheel portions, and whereby further movement of the handle means pulls the gripper means, wheel means, pin and carrier in a rotating movement about the axle.

5. The wheel driving apparatus of claim 4 wherein the wheel means comprises a first supportive wheel and a second, slightly smaller driving wheel connected laterally to the supportive wheel and wherein the opposed gripper means are positioned above and below a portion of the driving wheel.

6. Wheel driving apparatus comprising a frame, an axle mounted on the frame, wheel means mounted on the axle for rotating with respect to the frame, a carrier mounted on the axle and extending along the wheel, a pin connected to the carrier opposite a peripheral portion of the wheel means, opposed gripper means mounted on the pin for rotation thereon and positioned adjacent opposite portions of the wheel means, and a handle extending upward from the gripper means, whereby the gripper means may be rotated on the pin into gripping contact with the wheel portions, and whereby further movement of the handle means pulls the gripper means, wheel means, pin and carrier in a rotating movement about the axle, a pivot mounted on the gripper means perpendicular to the pin and brake means connected to the handle means above the pivot means whereby moving the handle transverse to a driving direction causes engagement of the brake means with the wheel means thereby stopping the wheel means.

7. The apparatus of claim 6 further comprising spring means connected between the gripper means and the brake means for urging the brake means away from the wheel means.

8. Wheel driving apparatus comprising a frame, an axle mounted on the frame, wheel means mounted on the axle for rotating with respect to the frame, a carrier mounted on the axle and extending along the wheel, a pin connected to the carrier opposite a peripheral portion of the wheel means, opposed gripper means mounted on the pin for rotation thereon and positioned adjacent opposite portions of the wheel means, and a handle extending upward from the gripper means, whereby the gripper means may be rotated on the pin into gripping contact with the wheel portions, and whereby further movement of the handle means pulls the gripper means, wheel means, pin and carrier in a rotating movement about the axle, wherein the carrier extends upward from the axle along opposite sides of the wheel means and extends across the top of the wheel means and wherein an upper member of the carrier has a T-shaped opening for receiving the handle means and permitting the handle means to tip forward and rearward and inward.

9. The wheel driving apparatus of claim 8 wherein the wheel means comprises a wheel chair supportive wheel with a laterally connected hand wheel and wherein the carrier partially surrounds both wheels from axle to axle, wherein the opposed gripper means comprises a rigid assembly mounted on the pin having a slightly concave upper jaw and a slightly convex lower jaw, respectively, outside and inside of a segment of the hand wheel and further comprising a pivot mounted on the rigid assembly above the uppermost concave jaw and extending a direction generally parallel to a tangent of the hand wheel and wherein the handle means is mounted on the pivot and extends upward through a T-shaped opening in the carrier and wherein a brake extends rigidly inward from the handle over the supportive wheel whereby tipping the handle inward about the pivot in the direction of the supportive wheel applies the brake to the supportive wheel, and further comprising means to urge the brake toward an upward disengaged position and upper and lower lug means mounted on an upper portion of the carrier near an intersection in the T-shaped opening and complementary lug means mounted on the handle for selectively engaging the upper and lower lug means to alternately prevent movement to a remote end of the T-shaped opening upon vertically positioning the handle and its lug in a position to avoid a corresponding upper or lower lug for movement of the handle and rigid assembly about the pin in the direction of an opposite remote portion of the T-shaped opening whereby the assembly and gripper blocks are tipped to lock on the hand wheel, whereby further movement of the handle urges the carrier and hand wheel in the direction of movement of the handle and whereby recovery of the handle in the reverse direction causes the handle lug to engage one of the upper and lower lugs to prevent opposite relative tipping of the handle with respect to the carrier and to cause the carrier to be recovered with the handle.

* * * * *